(12) United States Patent
Hutson (10) Patent No.: US 11,908,035 B2
(45) Date of Patent: Feb. 20, 2024

(54) SYSTEM AND METHOD FOR AUTHENTICATED MAIL

(71) Applicant: Frederick Hutson, Las Vegas, NV (US)

(72) Inventor: Frederick Hutson, Las Vegas, NV (US)

( * ) Notice: Subject to any disclaimer, the term of this patent is extended or adjusted under 35 U.S.C. 154(b) by 415 days.

(21) Appl. No.: 16/433,356

(22) Filed: Jun. 6, 2019

(65) Prior Publication Data

US 2020/0387998 A1 Dec. 10, 2020

(51) Int. Cl.
*G06Q 50/32* (2012.01)
*G06K 19/06* (2006.01)
*G06Q 50/26* (2012.01)

(52) U.S. Cl.
CPC ....... *G06Q 50/32* (2013.01); *G06K 19/06037* (2013.01); *G06Q 50/26* (2013.01)

(58) Field of Classification Search
None
See application file for complete search history.

(56) References Cited

U.S. PATENT DOCUMENTS

| 5,712,787 A | 1/1998 | Yeung |
| 5,774,554 A | 6/1998 | Gilham |
| 5,917,925 A | 6/1999 | Moore |
| 5,937,762 A | 8/1999 | Herbert |
| 6,385,731 B2 | 5/2002 | Ananda |
| 7,080,038 B2 | 7/2006 | Sansone |
| 7,089,210 B2 | 8/2006 | Sansone |
| 7,475,041 B2 | 1/2009 | Pintsov et al. |
| 7,502,451 B2 | 3/2009 | Gyllenskog et al. |
| 7,711,650 B1 | 5/2010 | Kara |

(Continued)

FOREIGN PATENT DOCUMENTS

| JP | 4157315 B2 | 10/2008 | |
| KR | 20160128049 A | * 11/2016 | ............ G06Q 50/32 |
| WO | 0175722 A1 | 10/2001 | |

OTHER PUBLICATIONS

McFarland, C., et al., "Interfacing with Next Generation Tagging and Tracking Systems for Prisons and Correctional Facilities", 2010 Seventh IEEE International Conference and Workshops on Engineering of Autonomic and Autonomous Systems (pp. 43-50). (Year: 2010).*

*Primary Examiner* — Neha Patel
*Assistant Examiner* — Clay C Lee
(74) *Attorney, Agent, or Firm* — Nath, Goldberg & Meyer; Richard C. Litman (57) ABSTRACT

Systems, methods, and computer-readable storage media for authenticating mail and preventing contraband from entering detention facilities. An exemplary system can receive, from a known user, a letter directed to an incarcerated individual and store, via a processor, a digital copy of the letter in a database. The system can then print a physical copy of the letter, where the physical copy has at least one of a QR code or a barcode on an exterior of the physical copy, and mail the physical copy to a detention center holding the incarcerated individual. Finally, the system can receive, at the processor and from a staff member of the detention center, a request to digitally screen the physical copy by digitally accessing the digital copy in the database, and transmit, via the processor, the digital copy to the staff member.

8 Claims, 5 Drawing Sheets

(56) References Cited

U.S. PATENT DOCUMENTS

| | | |
|---|---|---|
| 7,742,582 B2 | 6/2010 | Harper |
| 7,804,941 B2* | 9/2010 | Keiser .................. H04L 51/066 379/88.19 |
| 7,831,518 B2 | 11/2010 | Montgomery et al. |
| 8,041,645 B2 | 10/2011 | Cordery et al. |
| 8,204,177 B2 | 6/2012 | Harper |
| 8,291,239 B2 | 10/2012 | Pintsov |
| 8,598,482 B2 | 12/2013 | Bonnell et al. |
| 8,620,821 B1 | 12/2013 | Goldberg et al. |
| 8,807,425 B2* | 8/2014 | Saywa ............. G06K 19/06037 235/487 |
| 9,197,742 B1* | 11/2015 | Orr ...................... G06Q 20/145 |
| 9,311,627 B1 | 4/2016 | Shipman, Jr. et al. |
| 10,135,832 B1* | 11/2018 | Passe .................... H04L 63/102 |
| 2003/0084007 A1 | 5/2003 | Brookner |
| 2003/0140016 A1 | 7/2003 | Grotsky et al. |
| 2004/0108386 A1 | 6/2004 | Rasti |
| 2008/0057976 A1* | 3/2008 | Rae ..................... H04W 64/003 455/456.1 |
| 2008/0059219 A1 | 3/2008 | Chatte |
| 2010/0189228 A1* | 7/2010 | Seyfetdinov ............ H04M 3/42 379/88.14 |
| 2011/0213700 A1* | 9/2011 | Sant'Anselmo ....... G06Q 10/10 705/39 |
| 2013/0024326 A1* | 1/2013 | Dearing ................. G06Q 30/02 705/26.61 |
| 2013/0179949 A1* | 7/2013 | Shapiro ................... H04L 63/08 726/4 |
| 2015/0154813 A1 | 6/2015 | Rakow et al. |
| 2016/0112424 A1* | 4/2016 | Torgersrud .............. H04L 63/02 726/4 |
| 2016/0337360 A1 | 11/2016 | Logan |
| 2016/0364927 A1* | 12/2016 | Barry ................. G07C 9/00571 |
| 2017/0193428 A1 | 7/2017 | Abrams et al. |
| 2020/0125838 A1* | 4/2020 | Dalley, Jr. ............ H04N 23/617 |

* cited by examiner

SYSTEM AND METHOD FOR AUTHENTICATED MAIL

BACKGROUND

1. Technical Field

The present disclosure relates to mail delivery, and more specifically to authenticating the source of mail and preventing introduction of contraband into facilities using mail.

2. Introduction

Mail service is one of the oldest and most commonly used methods to introduce contraband into correction facilities, creating an expensive and often lethal problem for both inmates and corrections facility staff. To try and counter the inflow of contraband into correctional facilities many facilities implement costly counter measures, such as opening each piece of mail received and reviewing the content of letters and photographs. Still other counter measures can include restricting the type of mail which can be received at a given facility, such as only postcards (rather than envelopes with letters or packages). However, despite these policies, contraband continues to be a problem at correction facilities.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example method executed as disclosed herein can include: receiving, from a known user, a letter directed to an incarcerated individual; storing, via a processor, a digital copy of the letter in a database; printing a physical copy of the letter, where the physical copy has at least one of a QR code or a barcode on an exterior of the physical copy; mailing the physical copy to a detention center holding the incarcerated individual; receiving, at the processor and from a staff member of the detention center, a request to digitally screen the physical copy by digitally accessing the digital copy in the database; and transmitting, via the processor, the digital copy to the staff member.

An example system configured as disclosed herein can include: a database; a processor; and a non-transitory computer-readable storage medium having instructions stored which, when executed by the processor, cause the processor to perform operations which include: receiving, from a known user, a letter directed to an incarcerated individual; storing a digital copy of the letter in the database; printing a physical copy of the letter, where the physical copy has at least one of a QR code or a barcode on an exterior of the physical copy; mailing the physical copy to a detention center holding the incarcerated individual; receiving, from a staff member of the detention center, a request to digitally screen the physical copy by digitally accessing the digital copy in the database; and transmitting the digital copy to the staff member.

An exemplary non-transitory computer-readable storage medium configured as disclosed herein can have instructions stored which, when executed by a processor, cause the processor to perform operations which include: receiving, from a known user, a letter directed to an incarcerated individual; storing a digital copy of the letter in a database; printing a physical copy of the letter, where the physical copy has at least one of a QR code or a barcode on an exterior of the physical copy; mailing the physical copy to a detention center holding the incarcerated individual; receiving, from a staff member of the detention center, a request to digitally screen the physical copy by digitally accessing the digital copy in the database; and transmitting the digital copy to the staff member.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

While examples provided herein are largely directed to incarceration facilities, the principles and concepts disclosed herein can be applied to other secure facilities, such as military bases, government buildings, hospitals, certain office buildings, or any other facility with restricted public access.

To remedy the deficiencies noted above, disclosed herein are methods, systems, and computer-readable media for authenticating mail. The system allows users (such as the family of incarcerated individuals, attorneys, and/or other individuals) to send mail intended for an incarcerated individual to a third party instead of directly to the incarceration facility housing the incarcerated individual. In the case of consumers (e.g., non-attorneys), the third party (aka an "authenticated provider") receives the letter, stores a digital copy in a computer-readable database, and prints a copy of the letter. For attorneys, the attorney sends the letter directly to the incarceration facility, while the third party provides an authentication that the parcel comes from an attorney. This printed copy contains, on its exterior, postage information, information identifying the intended recipient of the letter, identifying information about the sender of the letter, and/or parcel identification information. The printed copy is then sent to the incarceration facility from the authenticated provider.

The incarceration facility staff can then use the parcel identification information associated with the parcel to (1) verify that the letter received at the incarceration facility came from the authenticated provider, and (2) to review the contents of the printed copy received at the incarceration facility without opening the copy received.

The verification process can occur in at least two distinct ways. In a first example, the incarceration facility can receive the printed copy of the letter with the parcel identification code on the exterior of the letter. Staff at the incarceration facility can then, upon receiving the printed copy, use the parcel identification code to remotely look up, online, information about the letter from the authenticated provider. In one such configuration, the staff can enter the parcel identification code into a field within a database retrieval program (i.e. via typing) or scan a QR code (or other barcode) associated with the parcel identification code, and the database retrieval program can access, through a network (such as the Internet), the database at the authenticated provider. The authenticated provider can then provide information about the letter which was sent. Legal mail, which is not digitized, is sent directly from the attorney to the incarceration facility.

In a second example, the authenticated provider can, upon digitizing the letter received (or authenticating an attorney letter), transmit a notification to the incarceration facility indicating that a printed copy is in transit with a known parcel identification code. The incarceration facility staff can then, upon receiving the letter, identify the letter as both expected and from an authenticated provider.

The parcel identification information can also be used to view a digital copy of the letter's content or, in the case of legal mail, identify the attorney/law office information (the actual contents are not digitized to protect attorney-client privilege). For example, prison staff receiving the printed copy of the letter can identify the parcel code on the printed copy, then use that parcel code to view a digital copy of the letter using online resources. That is, the prison staff can transmit a request (using the parcel code) to the database associated with the authenticated provider requesting access to a digital copy of the letter. Upon receiving the digital copy, the prison staff can perform an audit/analysis of the letter to determine if the letter contains prohibited content. Similarly, when the authenticated provider transmits notifications of letters which are in transit to the prison, the audit/analysis of the letter can occur before the letter arrives at the incarceration facility. For example, upon receiving the notification of a letter being in transit, the staff can engage in the audit/review/analysis of the letter.

Depending upon specific configurations, the analysis of the letter's content can occur manually, automatically, or as a hybrid of automation and manual review. In instances where a manual review of the letter's content is performed, this can be a staff member, at either the incarceration facility reading the letter and identifying any suspicious, illegal, prohibited, or otherwise censored content. Where an automated review of the letter's content is performed, the system performing the review (at the incarceration facility, the authenticated provider, or elsewhere) can process the letter using a semantic language processor based on rules which identify parts of speech, relationships between words, likely intent of the user, high-risk words, etc. Based on the output of the semantic language processor, the system can assign a score to the letter and, based on that score, approve or disapprove the letter's admission to the incarceration facility. More specifically, based on the score the incarceration facility can choose to reject the letter or determine that the letter requires additional review.

In a hybrid review of the letter's content, the system can perform an automated review as described above, and mark or otherwise identify content which is questionable and/or needs further review. For example, if a letter contains words which are considered high risk or indicative of possible conflicts with the policies of the incarceration facility, the system can mark those words and notify a human reviewer that the letter needs additional review. The additional review can occur at the incarceration facility or at the authenticated provider, depending on specific configurations.

Because the mail between incarcerated individuals and their attorneys have legal protection, verifying that a letter has, in fact, come from an attorney can also be a challenge. The current system can use a multi-factor authentication process to authenticate a letter being sent directly to the incarcerated individual from an attorney. Unlike the mail from friends and family described above, authenticated mail from attorneys would not have a digital copy stored in a database. However, the parcel code of the letter can still authenticate that the letter is (1) known beforehand, and (2) coming from a verified attorney.

Consider the following example. An attorney can be authorized to directly send legal mail using the system only after verifying their identity using a combination of different factors, such as verification of the attorney's law license, bar number, and/or other regulatory hurdles. Upon being verified as a practicing attorney, the attorneys can use multi-factor (such as two-factor) authentication to activate a trackable, pre-printed adhesive label provided by the authenticated provider to the attorney. That is, the authenticated provider can pre-print labels with inactive parcel codes and deliver those labels to the attorney. When the attorney is ready to send a letter to an incarcerated individual, the attorney can use an app or online authentication tool to verify their identity and activate a label. The system can respond with a parcel label activation notification indicating that a particular label in the attorney's possession (which was previously inactive) is now active. The attorney can then place the now active label on the parcel, along with postage and address information of the incarcerated individual.

One exemplary, non-limiting, practical application to the technical problem noted above is creating a verification system for the incarceration facility which allows the incarceration facility staff to identify where a letter is actually coming from. In addition, where review of the letter content is appropriate (e.g., non-legal mail), the disclosed system allows the letters to be reviewed without actually opening the letters received, which improves letter processing speed, facility security, and safety of the review staff. Because (with the exception of legal mail) the incarceration facility does not receive the actual letter sent from the mail sender, but instead receives a copy of the letter printed by the authenticated provider, contraband introduction can be significantly impaired.

By shifting the mail review process to a digital system in which digital copies of authenticated letters can be reviewed remotely from the center where the letter was originally received/digitized (the authenticated provider), the system: (1) improves speed of the review process by providing access to automated context/semantic document review systems; (2) improves accuracy of the review process by reducing/eliminating human subjectivity in the review process; (3) allows remote screening of mail prior to physical arrival at the incarceration facility; and (4) improves security of the review personnel by reducing their exposure to mail from unknown sources. In addition, depending on how long the digital copies of the letters are preserved by a given configuration, the system can provide a record of mail sent to incarcerated individuals.

Figure 1:
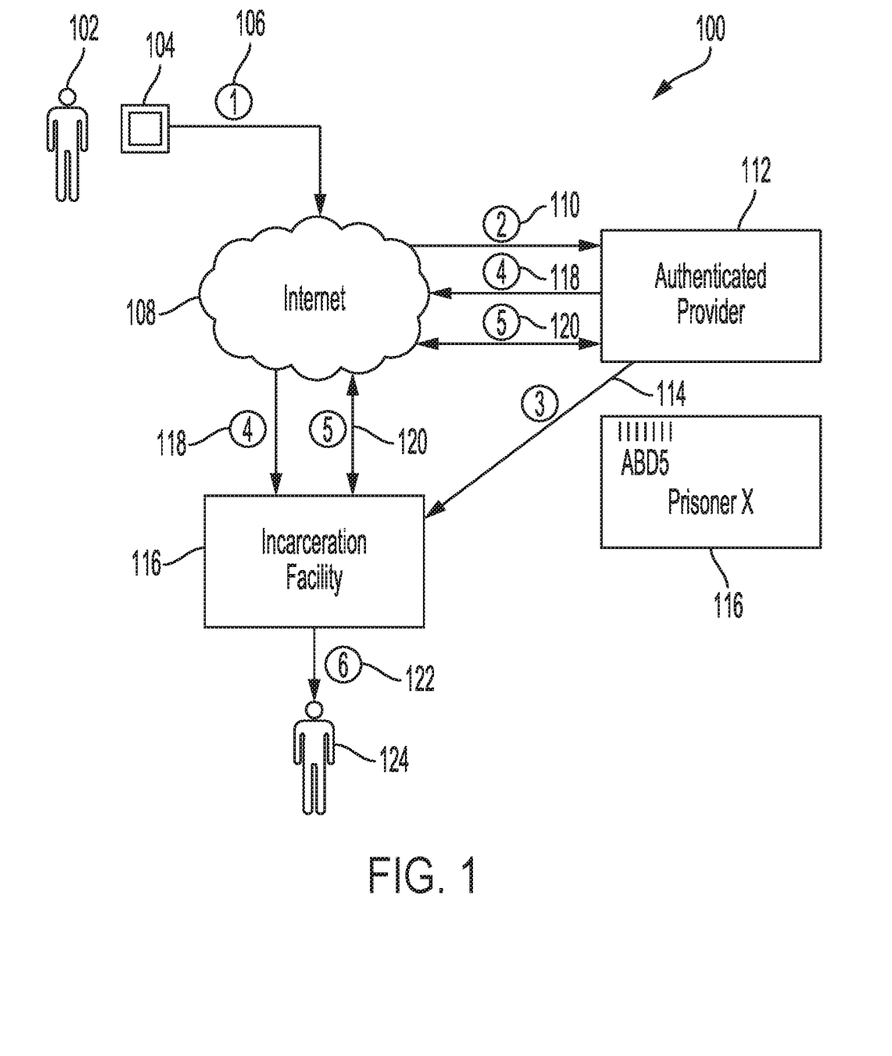
FIG. 1 illustrates an example of interactions between a mail sender, an authenticated mail provider, and an incarceration facility.

FIG. 1 illustrates an example of interactions 100 between a mail sender 102, an authenticated mail provider 112, and an incarceration facility 116 housing an incarcerated individual 124. In this example, the mail sender 102 wishes to send the incarcerated individual 124 a letter (which may include photographs) using a smartphone 104. The mail sender 102 composes the letter, then sends 106, 110 the letter to an authenticated provider 112 through a network, such as the Internet 108. The authenticated provider 112 receives the digital letter sent 106, 110 from the mail sender 102, saves a copy in a database. If the mail sender 102 had instead sent a "snail mail" letter to the authenticated provider 112, the authenticated provider would have received the hard copy of the letter, scanned/digitized the letter, and saved the digitized version to the database.

The authenticated provider 112 then prints a clean, physical copy 116 of the letter at the authenticated provider 112 facility and mails 114 that physical copy 116 to the incarceration facility 116. As the physical copy 116 is in transit 114 to the incarceration facility 116, the authenticated provider 112 transmits 118 a notification to the incarceration facility 116 informing them of the letter 116. This notification also identifies a parcel code of the letter 116, and allows the incarceration facility 116 to request/receive 120 data associated with the letter 116 from the authenticated provider 112, such as an identity of the original sender 102, a digital version of the contents of the letter 116 (if available), etc.

Finally, upon authenticating the letter 116 and, when possible, reviewing the contents of the letter 116, the incarceration facility 116 can deliver 122 the letter 116 to the intended recipient/incarcerated individual 124.

Figure 2:
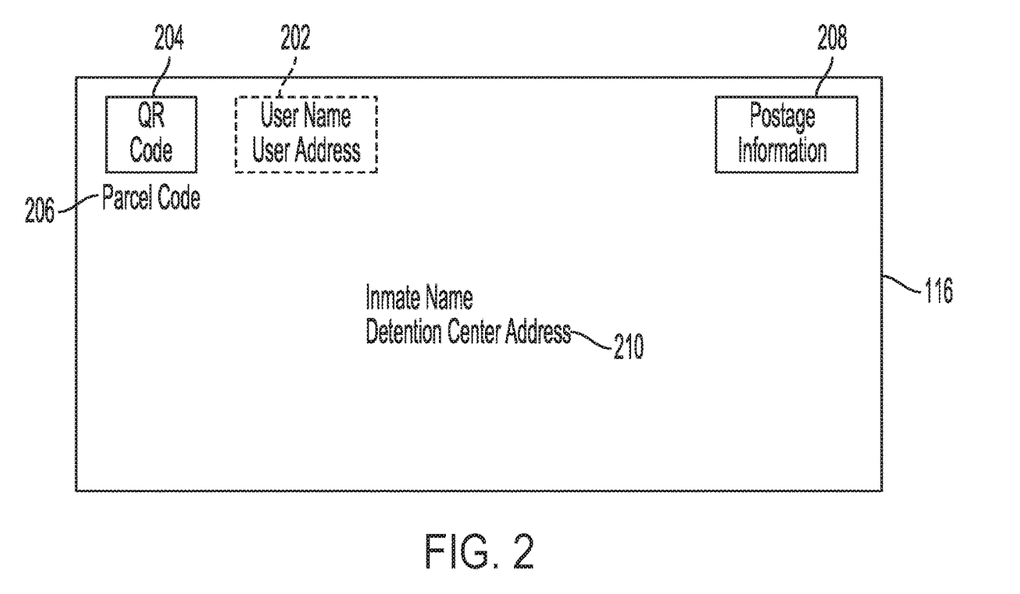
FIG. 2 illustrates an example of the exterior of a physical letter sent from an authenticated mail provider.

FIG. 2 illustrates an example of the exterior of a physical letter 116 sent from an authenticated mail provider 112. As illustrated, the physical letter 116 can have, on its exterior, known information about the original sender 102 of the letter. The letter 116 can also have QR code 204 (or a bar code) near the sender information 202. The QR code 204 can allow prison staff to scan the QR code 204 and have access to known information about the letter 116. This information can come from a database associated with the authenticated provider. Likewise, the letter 116 can have a parcel code 206 which functions similarly to that of the QR code 204, where the letter 116 can be searched for within a database according to its parcel code 206 and details associated with that letter can be retrieved based upon that search. The letter 116 can also contain addressee information 210, such as the inmate name, the detention center address, etc.

Figure 3:
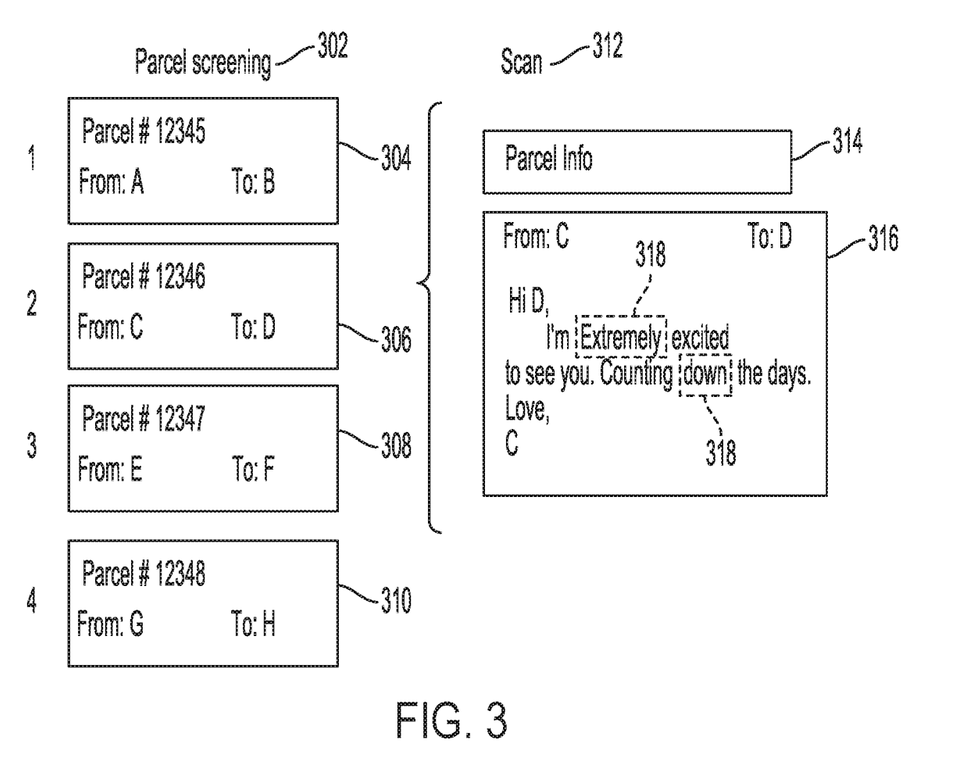
FIG. 3 illustrates an example of online parcel scanning.

FIG. 3 illustrates an example of online parcel scanning. As illustrated, the parcels are being digitally reviewed by a member of the incarceration facility staff using a computer system with online access to the database of information about the parcels from the authenticated provider 112. In this example, the authenticated provider 112 has transmitted, to an incarceration facility 116, a list 302 of parcels to the incarceration facility 116. The staff member can view the list 302 of expected parcels 304, 306, 308, 310, where each item in the list shows basic information about the parcel, such as the parcel identification number, the mail sender's name, and the name of the addressee.

As illustrated, the reviewing staff member has selected parcel "12346" 306, allowing them to see the digital scan/copy 312 of the letter as stored in the authenticated provider 112 database. As illustrated, the computer system can display records from the authenticated provider, including basic parcel information 314, as well as the digital version of the letter 316. Within the digital version of the letter 316 being reviewed, the system can flag or otherwise mark words 318 which may have other meanings, be against facility policy, be prohibited, etc. The staff member reviewing the letter can then make decisions regarding the letter in accordance with facility policy, such as replacing the marked words 318, returning the letter 316 to the sender, or allowing the letter 316 to go to its addressee.

Figure 4:
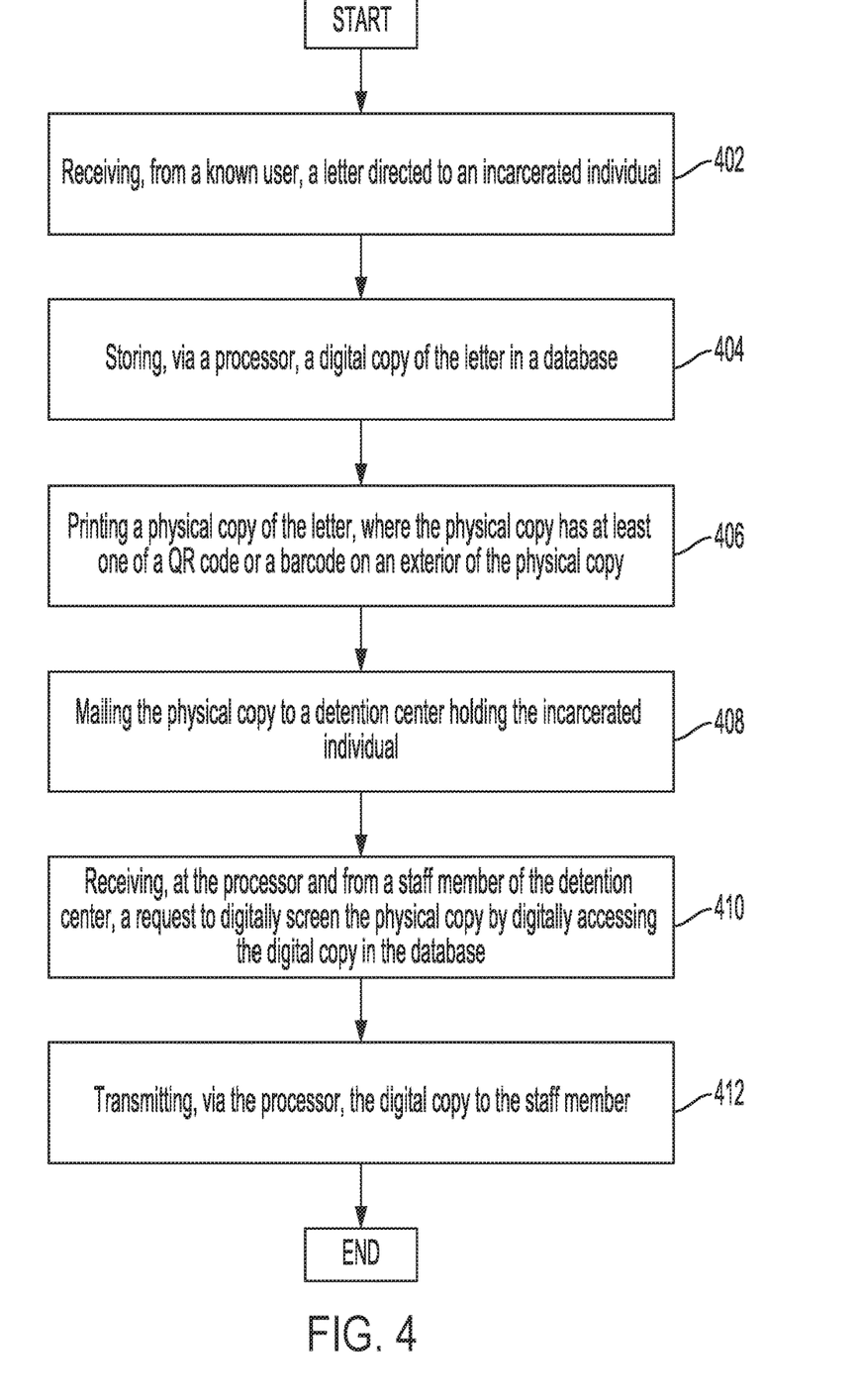
FIG. 4 illustrates an example method embodiment.

FIG. 4 illustrates an example method embodiment. The steps outlined herein are exemplary and can be implemented in any combination thereof, including combinations that exclude, add, or modify certain steps. In this example, the system receives, from a known user, a letter directed to an incarcerated individual (402). This letter can be received electronically (e.g., via a smartphone app, email, etc.) or as a hardcopy in the mail. The letter may also include photographs or other two-dimensional content. The system stores, via a processor, a digital copy of the letter in a database (404). This can occur, for example, by digitally scanning a physical copy of the letter, then saving the digital scan of the letter to the database, or (if the letter is received electronically), by storing a copy of the digital letter received to the database.

The system prints a physical copy of the letter, where the physical copy has at least one of a QR code or a barcode on an exterior of the physical copy (406). This physical copy of the letter which is printed can include postage information, destination address, sender address, and parcel identification information printed on the exterior of the physical copy, such that the system has no stamps, adhesive labels, or other items applied to the surface which could be used to hide contraband or affect the envelope. The content of the physical copy is the content of the letter received. The system then mails the physical copy to a detention center holding the incarcerated individual (408).

The system then receives, at the processor and from a staff member of the detention center, a request to digitally screen the physical copy by digitally accessing the digital copy in the database (410). In some cases, this step (410) can occur when the prison staff receives the physical copy of the letter. The prison staff can use the QR code, barcode, or other parcel identifier found on the exterior of the physical copy to look up the digital copy. The system can then, upon receiving the request (410), transmit, via the processor, the digital copy to the staff member (412). Using this digital copy, the staff member can review the content of the letter without actually opening the letter, providing a safety feature to the prison staff (e.g., limiting exposure of the prison staff to potential threats such as anthrax).

Alternatively, step (410) can occur while the letter is in transit from an authenticated provider and before the letter is received by prison staff. For example, the letter may be received by the authenticated provider, digitized and saved to a database, and a physical copy sent to the prison. At the same time, an electronic notification (such as an email or other electronic message) can be sent to the prison informing them that the parcel (physical copy) is in transit. The electronic notification can provide information about the parcel, such as the name of the sender, name of the intended recipient, when the parcel was sent, and the parcel code to access the interior/private content of the parcel. The prison staff can then use that parcel code to analyze or review the content of the letter for any inappropriate or prohibited communication prior to receiving the physical copy of the letter.

In some cases, the analysis of the letter's content can be performed entirely or partially automatically, with a processor or computing device identifying keywords, phrases, or other questionable content. In some cases, that questionable content can be forwarded to a human being for additional review, or the computing device can make a programmed determination regarding a violation of prison rules.

In some configurations, the illustrated method can further include: performing, via the processor, a pre-screen of the letter; storing, via the processor, results of the pre-screen in the database; and upon transmitting the digital copy to the staff member, transmitting the results of the pre-screen. This can allow the prison staff to be made aware of known issues or questionable content prior to performing any additional analysis.

In some configurations, the processor can verify that the physical copy was mailed from a location associated with the processor upon receiving the request.

As another example method, consider the following example of the illustrated method being executed from the prison perspective. In this case, the method can include: receiving, at an incarceration facility, a notification from a vendor indicating a printed letter is en route from the vendor to the incarceration facility for an incarcerated individual, wherein the notification comprises an identifier, the identifier identifying the printed letter and a digital copy of the printed letter; accessing the digital copy of the printed letter using the identifier; performing, via a processor, a content analysis of the digital copy prior; and based on the content analysis, accepting the printed letter into the incarceration facility.

Figure 5:
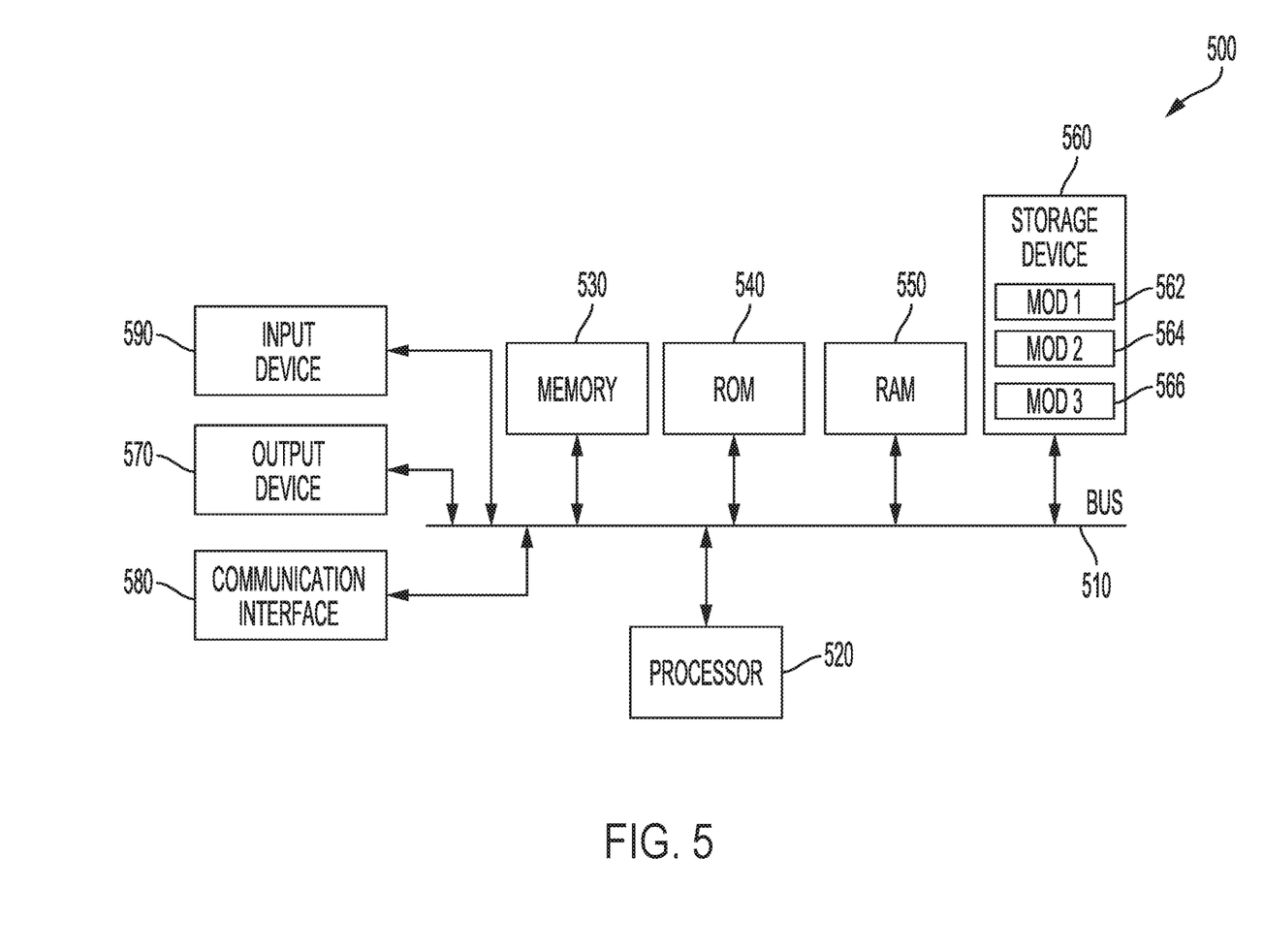
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520.

Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

receiving, at a computer system from an attorney, proof of a law license of the attorney;

verifying, at the computer system, the attorney as a verified attorney based on the proof;

receiving, at the computer system after verifying the attorney as a verified attorney, from a user (1) claiming to be the attorney and (2) claiming to have attorney-client privilege with an incarcerated individual, a first electronic notification that a physical letter directed to the incarcerated individual has been prepared by the user;

verifying, at the computer system over a network, the user as the attorney having the attorney-client privilege using a multi-factor authentication;

identifying, via the computer system, previously printed adhesive labels which were previously delivered to the attorney, each label in the previously printed adhesive labels having an individual QR code;

changing, within the computer system based on the multi-factor authentication, a parcel status of a single previously printed adhesive label in the previously printed adhesive labels from an inactive parcel held by the attorney to an active parcel label attached to the physical letter which is in transit via mail, resulting in an active label with an associated QR code; and transmitting, from the computer system, a second electronic notification to a detention center holding the incarcerated individual, the second electronic notification indicating that the physical letter having attorney-client privilege is en route to the detention center via mail with the active label on an exterior of the physical letter, the second electronic notification containing the associated QR code of the active label.

2. The method of claim 1, wherein the physical letter comprises photographs.

3. The method of claim 1, wherein the second electronic notification verifies to the detention center that the physical letter was mailed from the attorney and that the attorney has attorney-client privilege with the incarcerated individual.

4. A system comprising:

a database;

a processor; and a non-transitory computer-readable storage medium having instructions stored which, when executed by the processor, cause the processor to perform operations comprising:

receiving, from an attorney, proof of a law license of the attorney;

verifying the attorney as a verified attorney based on the proof;

receiving, from a user, (1) claiming to be the attorney and (2) claiming to have attorney-client privilege with an incarcerated individual, a first electronic notification that a physical letter directed to the incarcerated individual has been prepared by the user;

verifying the user as the attorney having the attorney-client privilege using a multi-factor authentication;

identifying previously printed adhesive labels which were previously delivered to the attorney, each label in the previously printed adhesive labels having an individual QR code;

changing, based on the multi-factor authentication, a parcel status of a single previously printed adhesive label in the previously printed adhesive labels from an inactive parcel label held by the attorney to an active parcel label attached to the physical letter which is in transit via mail, resulting in an active label with an associated QR code; and transmitting a second electronic notification to a detention center holding the incarcerated individual, the second electronic notification indicating that the physical letter having attorney-client privilege is en route via mail to the detention center with the active label on an exterior of the physical letter, the second electronic notification containing the associated QR code of the active label.

5. The system of claim 4, wherein the physical letter comprises photographs.

6. The system of claim 4, wherein the second electronic notification verifies to the detention center that the physical letter was mailed from the attorney and that the attorney has attorney-client privilege.

7. A non-transitory computer-readable storage medium having instructions stored which, when executed by a processor, cause the processor to perform operations comprising:

receiving, from an attorney, proof of a law license of the attorney;

verifying the attorney as a verified attorney based on the proof;

receiving, from a user, (1) claiming to be the attorney and (2) claiming to have attorney-client privilege with an incarcerated individual, a first electronic notification that a physical letter directed to the incarcerated individual has been prepared by the user;

verifying the user as the attorney having the attorney-client privilege using a multi-factor authentication;

identifying previously printed adhesive labels which were previously delivered to the attorney, each label in the previously printed adhesive labels having an individual QR code;

changing, based on the multi-factor authentication, a parcel status of a single previously printed adhesive label in the previously printed adhesive labels from an inactive parcel label held by the attorney to an active parcel label attached to the physical letter which is in transit via mail, resulting in an active label with an associated QR code; and transmitting a second electronic notification to a detention center holding the incarcerated individual, the second electronic notification indicating that the physical letter having attorney-client privilege is en route via mail to the detention center with the active label on an exterior of the physical letter, the second electronic notification containing the associated QR code of the active label.

8. The non-transitory computer-readable storage medium of claim 7, wherein the physical letter comprises photographs.

* * * * *